(12) United States Patent
Kobata et al.

(10) Patent No.: US 9,091,604 B2
(45) Date of Patent: Jul. 28, 2015

(54) APPARATUS AND METHOD FOR MEASURING WEIGHT AND TORQUE AT DOWNHOLE LOCATIONS WHILE LANDING, SETTING, AND TESTING SUBSEA WELLHEAD CONSUMABLES

(75) Inventors: Francisco Kazuo Kobata, Sao Paulo (BR); Lucas Antonio Perrucci, Sao Paulo (BR); Rafael Romeiro Aymone, Santana do Parnaiba (BR); Pedro Paulo Alfano, Santana do Parnaiba (BR)

(73) Assignee: Vetco Gray Inc., Houston, TX (US)

( * ) Notice: Subject to any disclaimer, the term of this patent is extended or adjusted under 35 U.S.C. 154(b) by 1171 days.

(21) Appl. No.: 13/040,002

(22) Filed: Mar. 3, 2011

(65) Prior Publication Data

US 2012/0223839 A1 Sep. 6, 2012

(51) Int. Cl.
| | |
|---|---|
| *G01V 3/00* | (2006.01) |
| *G01L 5/00* | (2006.01) |
| *E21B 44/00* | (2006.01) |
| *E21B 47/00* | (2012.01) |
| *G01L 3/10* | (2006.01) |
| *G01L 5/16* | (2006.01) |

(Continued)

(52) U.S. Cl.
CPC .............. *G01L 5/0076* (2013.01); *E21B 33/03* (2013.01); *E21B 33/04* (2013.01); *E21B 44/00* (2013.01); *E21B 47/0006* (2013.01); *G01L 3/108* (2013.01); *G01L 5/161* (2013.01)

(58) Field of Classification Search
CPC ... E21B 47/12; E21B 47/122; E21B 33/0355; E21B 47/18; E21B 44/00; E21B 47/0006; E21B 33/03; E21B 33/04; G01V 11/002; G01L 3/108; G01L 5/161; G01L 5/0076

USPC ........ 340/853.1, 856.3; 367/81; 166/335, 336
See application file for complete search history.

(56) References Cited

U.S. PATENT DOCUMENTS

| 4,608,861 A | 9/1986 | Wachtler et al. | |
|---|---|---|---|
| 4,715,451 A * | 12/1987 | Bseisu et al. ................... | 175/40 |

(Continued)

FOREIGN PATENT DOCUMENTS

| EP | 0539240 A2 | 4/1993 |
|---|---|---|
| EP | 1793079 A2 | 6/2007 |

(Continued)

OTHER PUBLICATIONS

GB Search Report dated Jun. 27, 2012 from corresponding Application No. GB1203554.9.

*Primary Examiner* — James Yang
(74) *Attorney, Agent, or Firm* — Bracewell & Giuliani LLP (57) ABSTRACT

A dynamometer measures applied weight and torque at a running tool location and transmits the measured information to a drilling rig operator. The system includes a dynamometer stem having a bidirectional torque and weight sensor coupled inline to the drill string, and further coupled to the running tool, so that the dynamometer stem will measure an applied torque and weight at the running tool and produce a signal in response. The dynamometer stem communicatively couples to a receptor stem, so that the receptor stem may receive the signal from the dynamometer stem. The receptor stem couples inline to the drill string at a rotary table of the drilling rig, and further communicatively couples to a display located proximate to an operator of the drilling rig, so that the receptor stem may transmit the signal to the display. The display presents the signal in real time to the operator.

11 Claims, 11 Drawing Sheets

(51) Int. Cl.
*E21B 33/03* (2006.01)
*E21B 33/04* (2006.01)

(56) References Cited

U.S. PATENT DOCUMENTS

| | | | |
|---|---|---|---|
| 4,760,735 A | | 8/1988 | Sheppard et al. |
| 4,862,426 A | * | 8/1989 | Cassity et al. .................. 367/81 |
| 5,144,298 A | | 9/1992 | Henneuse |
| 5,347,859 A | | 9/1994 | Henneuse et al. |
| 7,281,587 B2 | | 10/2007 | Haugen |
| 7,591,304 B2 | * | 9/2009 | Juhasz et al. ............... 166/77.51 |
| 7,757,759 B2 | | 7/2010 | Jahn et al. |
| 2002/0174991 A1 | | 11/2002 | Borak, Jr. |
| 2004/0045351 A1 | * | 3/2004 | Skinner ...................... 73/152.48 |
| 2004/0158404 A1 | | 8/2004 | Gaston et al. |
| 2004/0176672 A1 | * | 9/2004 | Silver et al. ................... 600/345 |
| 2008/0202810 A1 | | 8/2008 | Gomez |
| 2010/0314100 A1 | | 12/2010 | Tepavac et al. |

FOREIGN PATENT DOCUMENTS

| | | |
|---|---|---|
| WO | WO/2005/065364 | 1/2005 |
| WO | WO/2009/123462 | 8/2009 |

* cited by examiner

APPARATUS AND METHOD FOR MEASURING WEIGHT AND TORQUE AT DOWNHOLE LOCATIONS WHILE LANDING, SETTING, AND TESTING SUBSEA WELLHEAD CONSUMABLES

BACKGROUND OF THE INVENTION

1. Field of the Invention

This invention relates in general to sensing the torque and weight applied to a drill string and, in particular, to sensing the torque and weight applied to the drill string at mud line and sub mud line levels.

2. Brief Description of Related Art

In subsea drilling operations, a drilling vessel generally floats over an area that is to be drilled. The drilling vessel then runs a drilling riser that extends from the surface drilling vessel to a wellhead located at the sea floor. The drilling riser serves as the lifeline between the vessel and the wellhead as most drilling operations are performed through the drilling riser. As the devices are needed for the well, such as casing hangers, bridging hangers, seals, wear bushings, and the like, they pass from the surface of the vessel on a drill string through the riser, through the wellhead and into the wellbore. Weight and rotation are used to place and actuate these devices. Because of this, it is important to know with some specificity the weight and torque applied to the device in the subsea environment to know that the device has reached the appropriate position in the wellbore and properly actuated. Typically, this is accomplished by measuring the applied torque and weight at the drilling vessel.

Because drilling vessels float over the subsea wellhead, they are subject to the effects of ocean currents and winds. Ocean currents and winds will push drilling vessels such that they do not remain completely stationary over the wellhead, despite attempts to anchor them to the sea floor. In addition, the riser itself is subject to movement due to ocean currents. Because of this, the riser will not remain truly vertical between the wellhead and the drilling vessel. Instead, the riser will "curve" in response to the position of the vessel in relation to the wellhead and the effects of the current on the unanchored riser sections extending between the ends anchored at the drilling vessel and at the wellhead. As locations in deeper water are explored, the problem becomes exacerbated.

As the riser curves, the drill string passing through the riser will contact the riser rather than remaining suspended between the riser walls. At the locations where the drill string contacts the riser wall, the drill string becomes anchored, and transmits some of the operational weight and torque applied by the drilling vessel to the drill string from the drill string to the riser. Thus, the actual torque and weight applied to the device in the wellbore is less than the total torque and weight applied at the drilling vessel. Because the devices rely on the appropriate weight and torque to land, set, and test in the appropriate position in the wellbore, loss of torque and weight due to anchoring of the drill string against the riser may mean that operators at the drilling vessel are not properly testing, setting, or landing the devices because they are basing their actions on the torque and weight measurements taken at the drilling vessel. To ensure that appropriate torque and weight are applied to land, set, and test the devices, measurements of applied torque and weight at the device location are necessary.

One prior art method for sensing that appropriate weight and torque have been applied to set a downhole consumable involves the use of specially grooved casings at the landing locations of the downhole consumable. Proximity sensors are then incorporated into the consumable or alternatively in a separate tool inline with the consumable. The proximity sensors are tripped when the grooves on the special casing are proximate to the sensors. The proximity sensors then generate an acoustic signal that is received at the platform and interpreted as a landing of the tool. Unfortunately, these devices require the use of specialty tools and specialty casings in order to appropriately generate a setting/landing signal. In addition, the devices are unable to provide information about the applied weight and torque at the consumable that may indicate whether the rig and well are out of position relative to one another or that the drill string has become anchored.

Another prior art method for sensing the weight and torque at a downhole location involves the use of suspended strain gauge sensors to measure and record weight and torque at downhole locations. However, these sensors are used not to determine what is happening in real time, but instead to determine frictional losses during drilling, prior to the setting of any downhole consumables. The data and calculations from these devices are studied and used to conduct drilling operations at similar locations and formation types. They do not provide real time feedback to an operator during the landing, setting, and testing of wellhead consumables. Therefore, there is a need for a method and apparatus for sensing weight and torque in a mud line while landing, setting, and testing subsea wellhead devices.

SUMMARY OF THE INVENTION

These and other problems are generally solved or circumvented, and technical advantages are generally achieved, by preferred embodiments of the present invention that provide an apparatus for measuring weight and torque at downhole locations in real time, and a method for using the same.

In accordance with an embodiment of the present invention, a system for measuring torque and weight applied by a drilling rig to a drill string at a downhole subsea running tool, the system comprises a dynamometer stem, a receptor stem, and a display. The dynamometer stem has a bidirectional torque and weight sensor coupled inline to the drill string. The dynamometer stem is further coupled to the running tool, so that the dynamometer stem will measure an applied torque and weight at the running tool and produce a signal in response. The dynamometer stem communicatively couples to a receptor stem, so that the receptor stem may receive the signal from the dynamometer stem. The receptor stem is in turn coupled inline to the drill string at a rotary table of the drilling rig, and further communicatively coupled to a display located proximate to an operator of the drilling rig. The communicative coupling between the receptor stem and the display allows the receptor stem to transmit the signal to the display. The display, in turn, presents the signal in real time to the operator.

In accordance with another embodiment of the present invention, a system for measuring torque and weight applied by a drilling rig to a drill string at a downhole subsea running tool, the system comprises a dynamometer stem, a signal transmitter, a signal receptor, and a display. The dynamometer stem has a bidirectional load cell coupled inline to the drill string and further coupled to the running tool. The signal transmitter couples to the dynamometer stem and the bidirectional load cell. The signal transmitter is configured to receive a plurality of signals from the bidirectional load cell, and transmit those signals to the signal receptor. The signal receptor communicatively couples to the display, and the display is configured to present the signal in a manner understood by an operator in real time.

In accordance with yet another embodiment of the present invention, a method for sensing weight and torque in a mud line while landing subsea wellhead consumables applied by a drilling rig to a drill string at a downhole subsea running tool comprises the following steps. First, the method provides a weight and torque sensing system and couples it inline to the drill string and the running tool. Next, the method runs the sensing system down a subsea riser and into the mud line of a wellbore. The method then operates the running tool, and generates a signal in a bidirectional load cell of the weight and torque sensing system in response to the operation of the running tool. Next, the method transmits the signal from a bidirectional load cell of the sensing system to a display at the drilling rig, and communicates the signal to a drilling rig operator.

An advantage of a preferred embodiment is that it provides a measurement of the applied torque and weight at a device location in the subsea wellbore in real time. This allows operators of a drilling vessel to have greater certainty that the device has properly landed and set in the wellbore. In addition, by comparing it to measurements of torque and weight applied at the surface, operators will have an indication that the drill string has anchored to the subsea riser.

BRIEF DESCRIPTION OF THE DRAWINGS

So that the manner in which the features, advantages and objects of the invention, as well as others which will become apparent, are attained, and can be understood in more detail, more particular description of the invention briefly summarized above may be had by reference to the embodiments thereof which are illustrated in the appended drawings that form a part of this specification. It is to be noted, however, that the drawings illustrate only a preferred embodiment of the invention and are therefore not to be considered limiting of its scope as the invention may admit to other equally effective embodiments.

FIG. 4A-5B are schematic representations of weight and torque sensors employed by the exemplary measuring tool of FIG. 3.

DETAILED DESCRIPTION OF THE PREFERRED EMBODIMENT

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

In the following discussion, numerous specific details are set forth to provide a thorough understanding of the present invention. However, it will be obvious to those skilled in the art that the present invention may be practiced without such specific details. Additionally, for the most part, details concerning drilling rig operation, riser make up and break out, operation and use of wellhead consumables, and the like have been omitted inasmuch as such details are not considered necessary to obtain a complete understanding of the present invention, and are considered to be within the skills of persons skilled in the relevant art.

Figure 1:
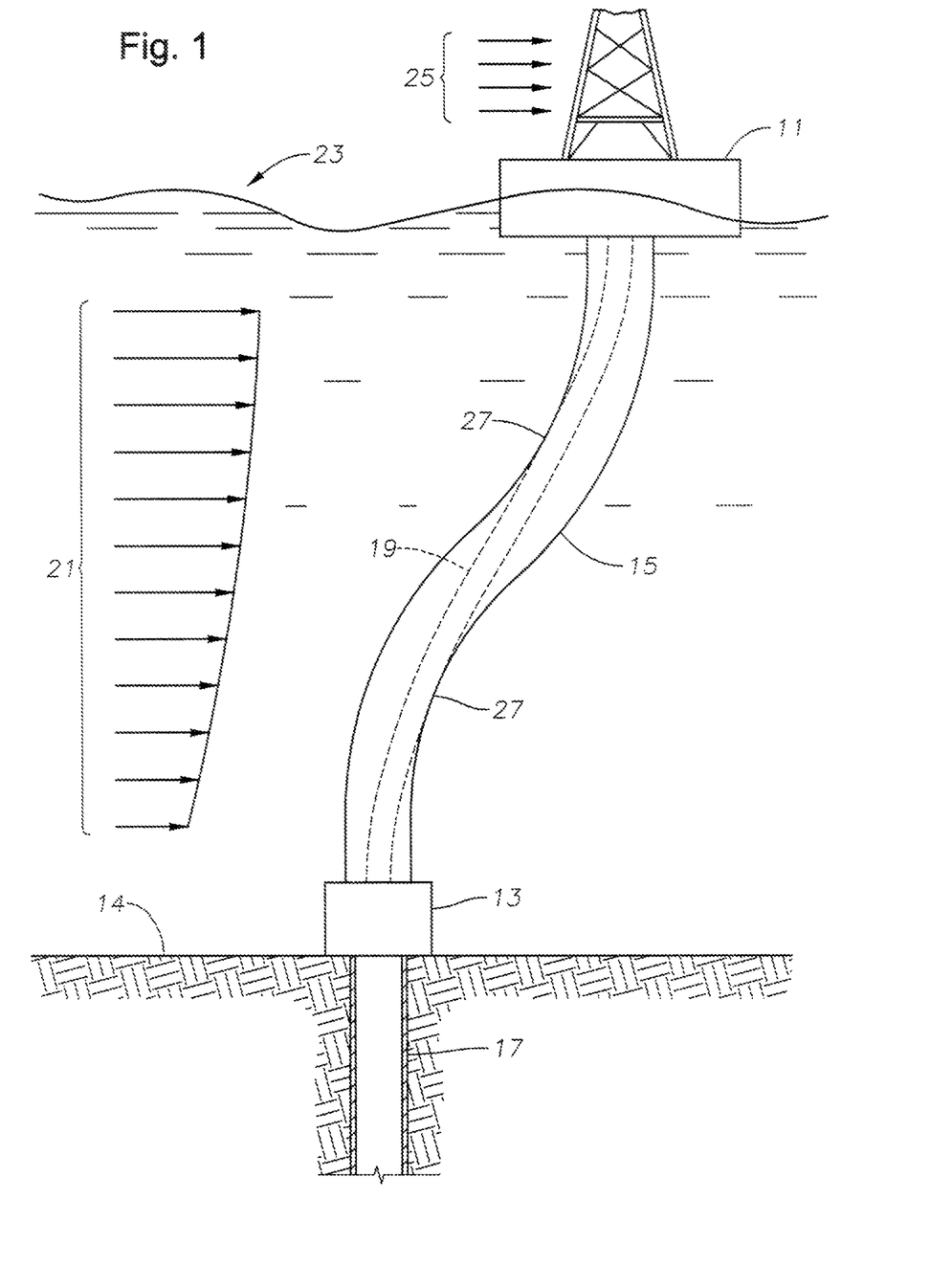
FIG. 1 is a schematic representation of a riser extending between a wellhead assembly and a floating platform.

Referring to FIG. 1, there is shown a floating drilling platform 11 connected to a wellhead assembly 13 at a subsea floor by a riser 15. A string 17, such as a casing string or liner string, extends from the wellhead assembly 13 to a subsurface wellbore bottom (not shown). Riser 15 enables drill pipe 19 to be deployed from floating platform 11 to wellhead assembly 13 and on into string 17 below a mud line 14. Drill string 19 receives rotational torque and a downward force or weight from drilling devices located on floating platform 11. While made up of rigid members, riser 15 does not remain completely rigid as it traverses the distance between floating platform 11 and wellhead assembly 13. Riser 15 is comprised of joints each of which may allow some movement from substantially vertical. The combined effect of slight movement of each joint will cause riser 15 to "bend" in response to vertical motion from floating platform 11 due to surface swells 23, lateral motion caused by a subsea current 21, and lateral movement of floating platform 11 in response to a wind 25. As shown, subsea current 21, swells 23, and wind 25 have moved floating platform 11 so that riser 15 is in the curved position shown in FIG. 1.

Drill string 19 does not "bend" in response to environmental conditions. Drill string 19 remains substantially rigid as it passes through riser 15 from floating platform 11 to wellhead assembly 13, and then into string 17. Consequently, an exterior diameter of drill string 19 will contact an inner diameter surface of riser 15 as shown at contact locations 27. At these locations, a portion of the rotational torque and weight applied to drill string 19 at floating platform 11 transfers from drill string 19 to riser 15, causing the actual applied torque and weight to downhole tools to be less than that applied at the surface.

Figure 2:
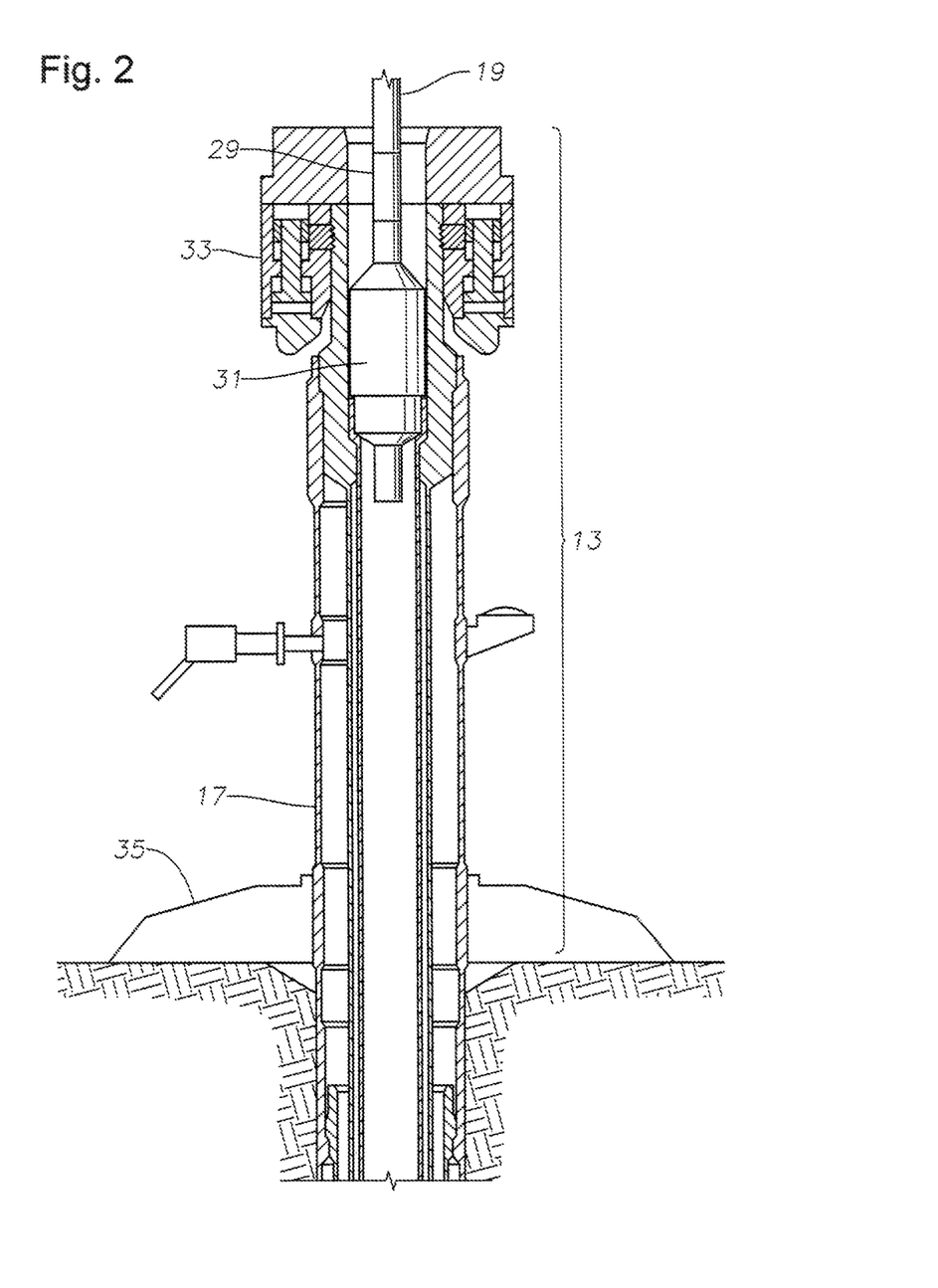
FIG. 2 is a schematic representation of a drilling tool employing an embodiment of the present invention.

As shown in FIG. 2, to measure the actual rotational torque and weight applied at or below mud line 14, a dynamometer stem 29 is coupled inline between a running tool 31 and drill string 19 during setting of a subsea wellhead equipment, such as casing hanger 32, by running tool 31. Running tool 31 is a conventional tool used to land and operate subsea wellhead equipment such as casing hangers, tubing hangers, seals, wellhead housings, trees, etc. Running tool 31 is run on drill string 19 to a position within wellhead assembly 13 such as at a blow out preventor (BOP) 33, or further down string 17, such as at wellhead 35 or even further downhole. Dynamometer stem 29 contains operational elements that measure rotational torque and weight applied at running tool 31. These measurements may be communicated to drilling platform 11 in any suitable manner, or optionally stored in dynamometer stem 29 and recovered at a later date. In the illustrated embodiment, the measurements are communicated to drilling platform 11 in real time so that an operator on platform 11 may respond accordingly.

Figure 3:
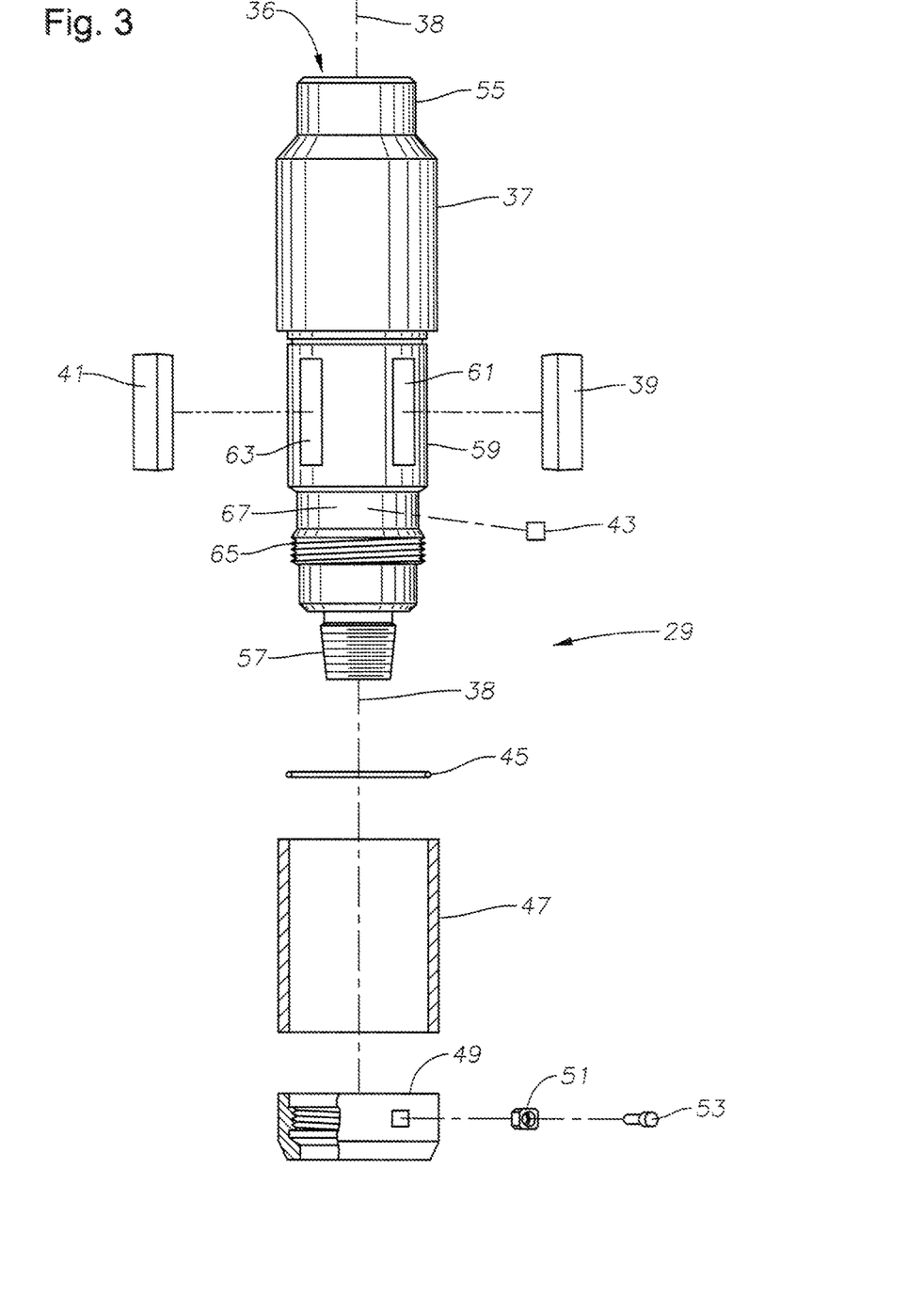
FIG. 3 is a schematic representation of an exemplary measuring tool employed in FIG. 2.

Referring now to FIG. 3, there is shown a detailed view of dynamometer stem 29. Dynamometer stem 29 may include a tubular body 37, an acoustic transmitter 39, a battery 41, a plurality of strain gauges 43, elastomeric seals 45, a protective sleeve 47, a retainer nut 49, a key 51, and a setting screw 53. Tubular body 37 defines a bore 36 having an axis 38 for allowing the passage of drilling fluids or hydrocarbons, depending on the particular operation under which the well is currently undergoing. Tubular body 37 has an upper end 55 configured to couple to drill string 19 (FIG. 2). A person skilled in the art will understand that the coupling could be a threaded connection, a clamping connection, or any other suitable drill string coupling. Similarly, tubular body 37 (FIG. 3) has a lower end 57 configured to couple to running tool 31 (FIG. 2). A person skilled in the art will understand that the coupling could be a threaded connection, a clamping connection, or any other suitable drill string coupling.

A lower body recess 59 is formed in a lower portion of tubular body 57 of a size and shape such that protective sleeve 47 may slide over tubular body 37 at lower body recess 59 circumscribing tubular body 37. In the illustrated embodiment, an exterior diameter surface of protective sleeve 47 will be flush with an exterior diameter surface of tubular body 37 when protective sleeve 47 circumscribes tubular body 37 after assembly. Tubular body 37 further defines a transmitter recess 61 and a battery recess 63. Both transmitter recess 61 and battery recess 63 extend from an exterior diameter surface of lower body recess 57 inward toward bore 36. Transmitter recess 61 is of a size and shape such that acoustic transmitter 39 may fit into transmitter recess 61, substantially filling transmitter recess 61 while allowing protective sleeve 47 to circumscribe tubular body 37 at lower body recess 59. Similarly, battery recess 63 is of a size and shape such that battery 41 may fit into battery recess 63, substantially filling battery recess 63, while allowing protective sleeve 47 to circumscribe tubular body 37 at lower body recess 59.

Seal 45 may be formed of elastomer and comprise an o-ring as illustrated. Seal 45 will pass over lower body recess 59, and, after protective sleeve 47 circumscribes lower body recess 59, seal an annular space between protective sleeve 47 and tubular body 37. During assembly, after protective sleeve 47 slides over lower body recess 59, retainer nut 49 may be threaded onto tubular body 37 through a matching thread 65 formed in the exterior diameter surface of tubular body 37 such that retainer nut 49 will abut and hold in place protective sleeve 47. In the illustrated embodiment, retainer nut 49 is further secured by key 51 slotted into a slot in retainer nut 49 and held in place with set screw 53.

An annular gauge recess 67 is formed in the surface of lower body recess 59 axially beneath transmitter recess 61 and battery recess 63 and axially above thread 65. Gauge recess 67 extends form the surface of lower body recess 59 radially inward toward bore 36. Gauge recess 67 is of a sufficient depth such that the plurality of gauges 43 may be placed in gauge recess 43 while allowing protective sleeve 47 to slide over gauges 43 without interfering with their operation. In addition, the surface of lower body recess 59 may be contoured between transmitter, battery, and gauge recesses 61, 63, 67 to allow for a communicative coupling to be made between battery 41, acoustic transmitter 39, and strain gauges 43. In the exemplary embodiment, tubular body 37 is formed of SAE 4340 steel, quenched and tempered at 42HRC. Alternative embodiments may use any suitable material having a high yield stress and low hysteresis, such as aluminum 6061 or the like.

Battery 41 comprises a battery storing electrical potential that may be transmitted and used by a device needing electrical current to operate. Acoustic transmitter 39 may be such a device. Acoustic transmitter 39 may include a controller configured to receive electric potential from battery 41 and supply a voltage to strain gauges 43. Acoustic transmitter 39 is configured to supply strain gauges 43 with a steady voltage and receive a variable voltage in response. Acoustic transmitter 39 may receive a voltage from strain gauges 43 and communicates that voltage received from strain gauges 43 to uphole devices as an acoustic signal. Prior to communicating the signal uphole, acoustic transmitter 39 may pass the signal through an amplification circuit optionally included in acoustic transmitter 39. In operation, battery 41 electrically couples to acoustic transmitter 39 so that transmitter 39 may receive power from battery 41. In turn, acoustic transmitter 39 electrically couples to strain gauges 43 so that acoustic transmitter 39 may supply a voltage to strain gauges 43, and receive a voltage from strain gauges 43 in response to the supplied voltage. In the exemplary embodiment, when running tool 31 operates through a load applied at platform 11, strain gauges 43 will operate as describe below to supply a response voltage that is read by acoustic transmitter 39 and then communicated uphole by acoustic transmitter 39.

Figure 4A:
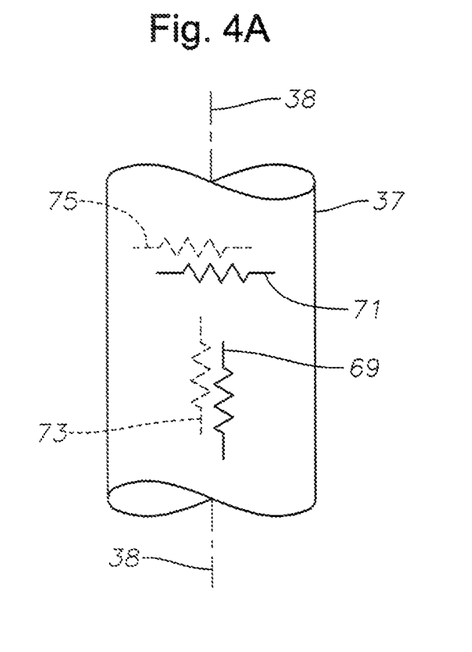

Referring now to FIGS. 4A through 5B, the plurality of strain gauges 43 are arranged to form a two channel, bidirectional load cell. In the exemplary embodiment, one channel is arranged to measure weight, and a second channel is arranged to measure torque. The plurality of strain gauges may include eight strain gauges arranged to form two separate Wheatstone bridges. The first, as illustrated in FIG. 4A, may be on the first channel and be arranged to include four strain gauges 69, 71, 73, and 75 bonded to the surface of tubular body 37 in gauge recess 67. In the exemplary embodiment, the strain gauge arrangement illustrated in FIG. 4B is used to measure weight. Two strain gauges 69, 73 will be aligned parallel to axis 38, and two strain gauges 71, 75 will be aligned perpendicular to axis 38. Strain gauges 71 and 75 will be on diametric sides of tubular body 37. Similarly, strain gauges 69 and 73 will be on diametric sides of tubular body 37.

Figure 4B:
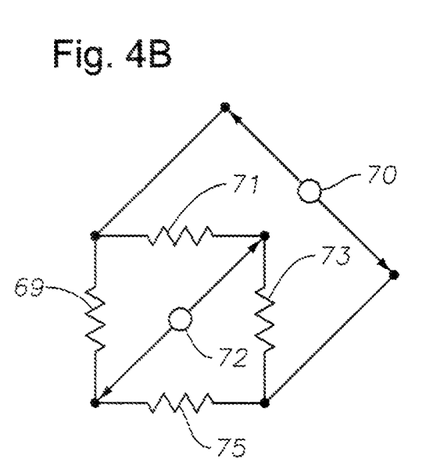

As shown in FIG. 4B, strain gauges 69, 71, 73, and 75 will be communicatively coupled as follows. Strain gauge 69 may couple at a first end to a first end of strain gauge 71. A second end of strain gauge 69 may couple to a first end of strain gauge 75. A second end of strain gauge 71 may couple to a first end of strain gauge 73. A second end of strain gauge 73 may couple to a second end of strain gauge 75. A voltage is applied at input nodes 70 connecting strain gauges 69 and 71, and 73 and 75. A corresponding output voltage may be read at output nodes 72 connecting strain gauges 69 and 75, and 71, 73. Acoustic transmitter 39 communicatively couples to input nodes 70 connecting strain gauges 69 and 71, and 73 and 75, to apply a known voltage input. Acoustic transmitter 39 is in turn coupled to output nodes 72 at strain gauges 69 and 75, and 71 and 73 from which an output voltage is read and transmitted.

Figure 5A:
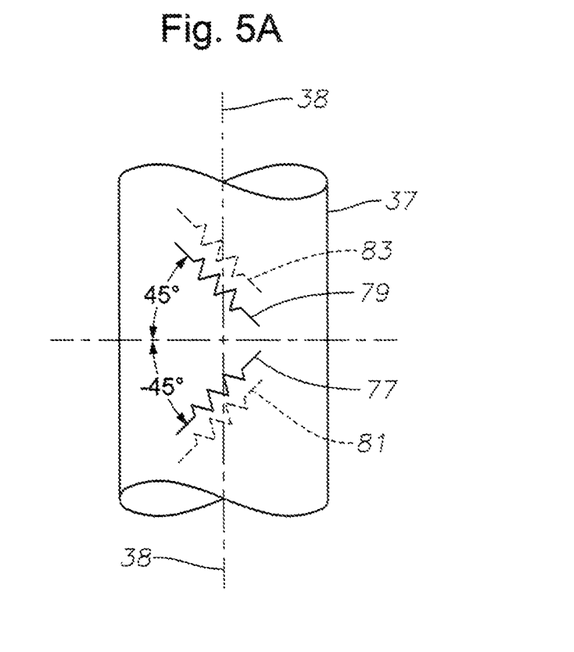
Figure 5B:
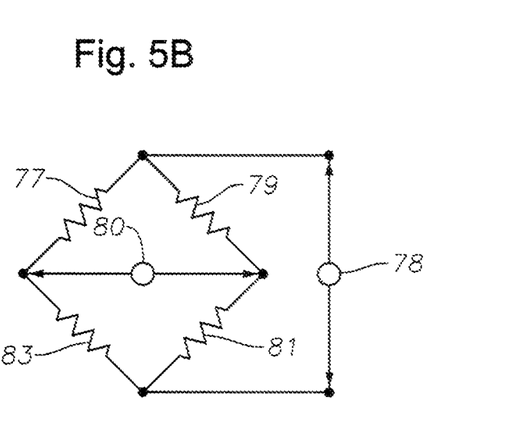

The second Wheatstone bridge, as illustrated in FIGS. 5A and 5B, may be on the second channel and be arranged to include four strain gauges 77, 79, 81, and 83 bonded to the surface of tubular body 37 in gauge recess 67. In the exemplary embodiment, the stain gauge arrangement illustrated in FIG. 5A is used to measure torque. Two strain gauges 77, 81 will be aligned at a negative 45 degree angle to an axis perpendicular to axis 38, and two strain gauges 79, 83 will be aligned at a positive forty-five degree angle to an axis perpendicular to axis 38. Strain gauges 77 and 81 will be on diametric sides of tubular body 37. Similarly, strain gauges 79 and 83 will be on diametric sides of tubular body 37.

As shown in FIG. 5B, strain gauges 77, 79, 81, and 83 will be communicatively coupled as follows. Strain gauge 77 may couple at a first end to a first end of strain gauge 79. A second end of strain gauge 77 may couple to a first end of strain gauge 83. A second end of strain gauge 79 may couple to a first end of strain gauge 81. A second end of strain gauge 81 may couple to a second end of strain gauge 83. A voltage is applied at input nodes 78 connecting strain gauges 77 and 79, and 81 and 83. A corresponding output voltage may be read at output nodes 80 connecting strain gauges 77 and 83, and 79, 81. Acoustic transmitter 39 communicatively couples to input nodes 78 connecting strain gauges 77 and 79, and 81 and 83. A known voltage is applied to these nodes by acoustic transmitter 39. Acoustic transmitter 39 is in turn coupled to output nodes 80 at strain gauges 77 and 83, and 79 and 81 from which an output voltage is read and transmitted. Acoustic transmitter 39 is powered by an electrical coupling to battery 41. Prior to placement in drill string 19, acoustic transmitter 39 is powered on to begin applying voltage to and reading voltage from the two wheatstone bridges of the exemplary embodiment. A person skilled in the art will understand that additional strain gauge wheatstone bridge arrangements may be used to provide larger data sets.

Acoustic transmitter 39 may receive the voltage reading from the output nodes and convert the electrical voltage into an acoustic signal in any suitable manner. Acoustic transmitter 39 may be connected to tubular body 37 such that acoustic transmitter 39 can generate an acoustic signal that may then transmit the acoustic signal through drill pipe 19 to a receptor stem 87 described below with respect to FIG. 7.

Prior to deployment downhole, dynamometer 29 is calibrated in the following manner. Voltage is applied to strain gauges 43 at input nodes 70, 78 described above, and an output voltage is read and recorded from output nodes 72, 80 as the base output voltage. An external device will then apply a known load of weight and torque to dynamometer 29 while the same voltage is applied to strain gauges 43 at input nodes 70, 78. A corresponding voltage is read and recorded from output nodes 72, 80. The process is repeated to create a dataset that relates load applied to the output voltage produced. From this dataset, a calibration moment equation is created that will allow a load applied to the dynamometer to be determined from an output voltage read from output nodes 72, 80.

Figure 6:
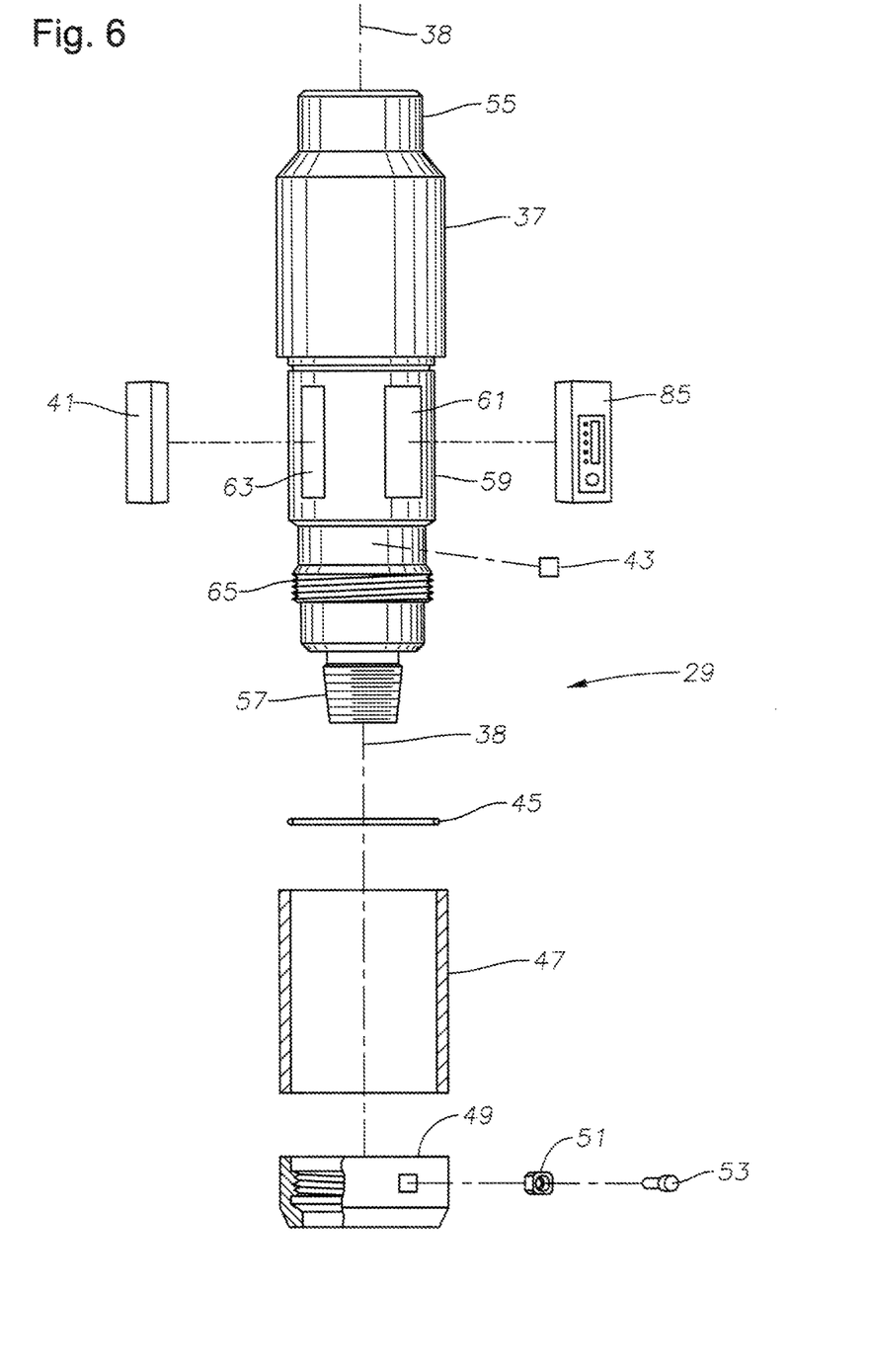
FIG. 6 is a schematic representation of an alternative measuring tool.

In an alternative embodiment, illustrated in FIG. 6, a data logger 85 may replace acoustic transmitter 39. Data logger 85 will couple to the plurality of strain gauges 43 as described above with respect to acoustic transmitter 39 in FIGS. 4A through 5B. However, unlike acoustic transmitter 39, data logger 85 will not transmit the signal to the surface. Instead, data logger 85 will store all readings taken into a data storage unit for analysis after removing dynamometer stem 29 from the wellbore.

Figure 7:
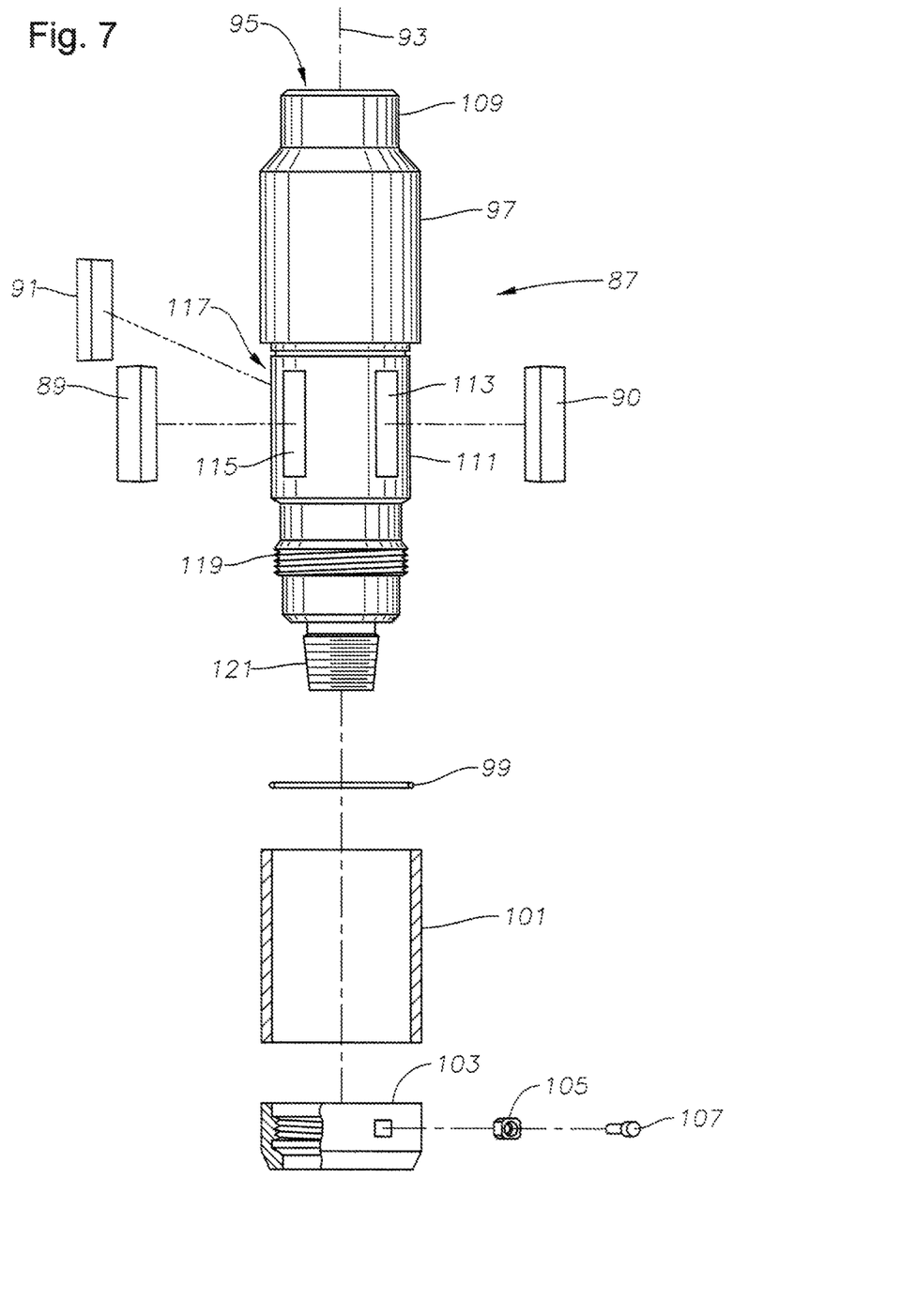
FIG. 7 is a schematic representation of a receptor tool employed in an embodiment of the present invention.
Figure 8:
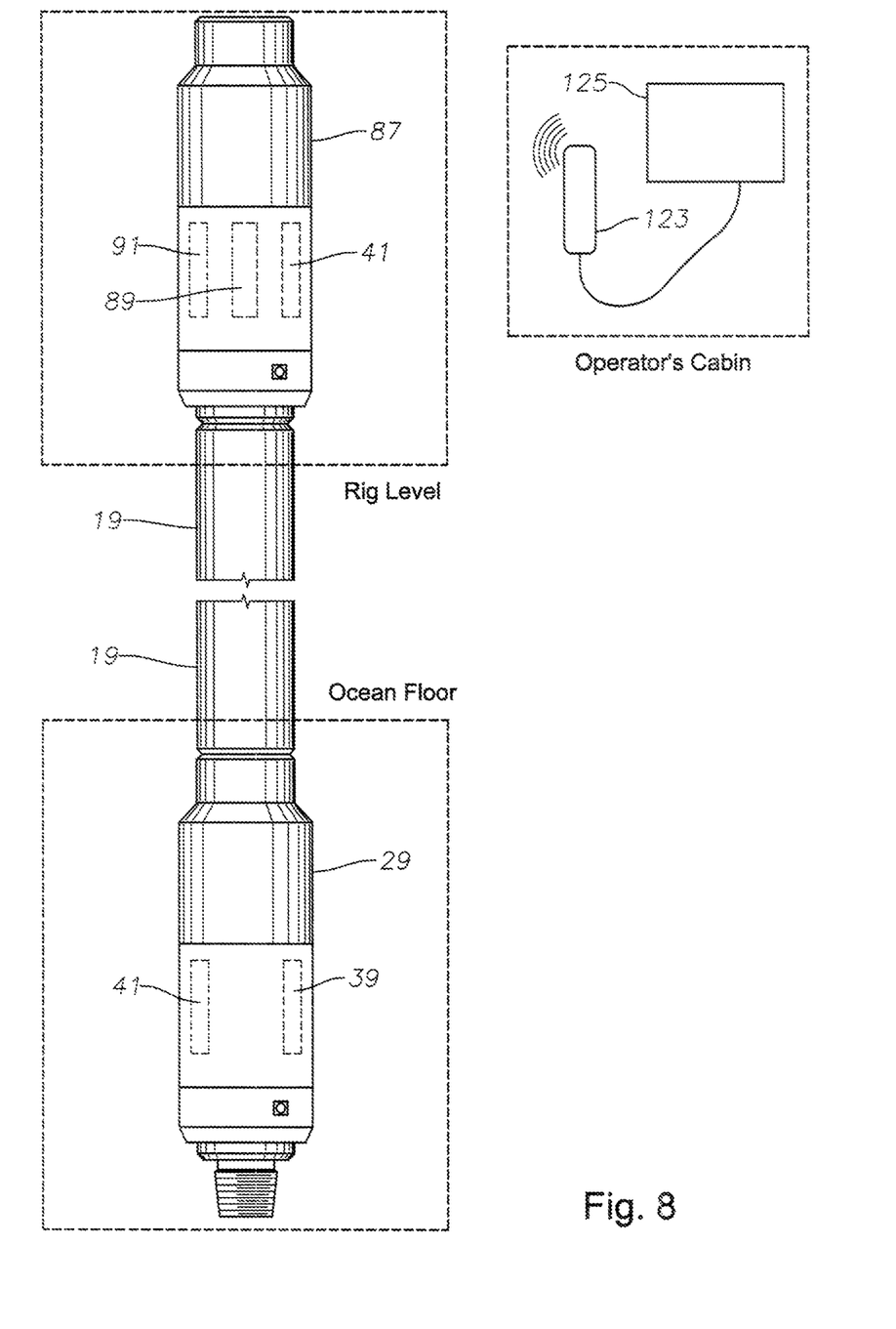
FIG. 8 is a schematic representation of the measuring tool, the receptor tool, and a display area communicatively coupled in an embodiment of the present invention.

Referring now to FIG. 7, there is shown a detailed view of receptor stem 87 that is located above sea level and receives the acoustic signal from acoustic transmitter 39. Receptor stem 87 may include a tubular receptor body 97, an acoustic receptor 89, a battery 90, a radio transmitter 91, receptor elastomeric seals 99, a receptor protective sleeve 101, a receptor retainer nut 103, a receptor key 105, and a receptor setting screw 107. Receptor body 97 defines a receptor bore 95 having an axis 93 for allowing the passage of drilling fluids or hydrocarbons, depending on the particular operation under which the well in currently undergoing. Receptor body 97 has an upper end 109 and a lower end 121 configured to couple to drill string 19 (FIG. 2 and FIG. 8). A person skilled in the art will understand that the coupling could be a threaded connection, a clamping connection, or any other suitable drill string coupling.

A receptor body recess 111 is formed in a lower portion of receptor body 97 of a size and shape such that receptor protective sleeve 101 may slide over receptor body 97 at receptor body recess 111 circumscribing receptor body 97 at receptor body recess 111 after assembly. In the illustrated embodiment, an exterior diameter surface of receptor protective sleeve 101 will be flush with an exterior diameter surface of receptor body 97 when protective sleeve 101 circumscribes receptor body 97. Receptor body 97 further defines a receptor battery recess 113, a receptor recess 115, and a receptor transmitter recess 117 on the reverse side of FIG. 7. Receptor battery recess 113, receptor recess 115, and receptor transmitter recess 117 extend from an exterior diameter surface of receptor body recess 111 inward toward receptor bore 95. Receptor battery recess 113 is of a size and shape such that battery 90 may fit into receptor battery recess 113, substantially filling receptor battery recess 113 while allowing receptor protective sleeve 101 to circumscribe receptor body 97 at receptor body recess 111. Similarly, receptor recess 115 is of a size and shape such that acoustic receptor 89 may fit into receptor recess 115, substantially filling receptor recess 115 while allowing receptor protective sleeve 101 to circumscribe receptor body 97 at receptor body recess 111. In addition, receptor transmitter recess 117 is of a size and shape such that radio transmitter 91 may fit into receptor transmitter recess 117, substantially filling receptor transmitter recess 117 while allowing receptor protective sleeve 101 to circumscribe receptor body 97 at receptor body recess 111.

Receptor seal 99 may be formed of elastomer and comprise an o-ring shape as illustrated. Receptor seal 99 will pass over receptor body recess 111, and, after receptor protective sleeve 101 circumscribes receptor body recess 111, seal an annular space between receptor protective sleeve 101 and receptor body 97. During assembly, after receptor protective sleeve 101 slides over receptor body recess 111, receptor retainer nut 103 may be threaded onto receptor body 97 through a matching receptor thread 119 formed in the exterior diameter surface of receptor body 97 such that receptor retainer nut 103 will abut and hold in place receptor protective sleeve 101. In the illustrated embodiment, receptor retainer nut 103 is further secured by receptor key 105 slotted into a slot in receptor retainer nut 103 and held in place with receptor set screw 107. In the exemplary embodiment, receptor body 97 is formed of SAE 4340 steel, quenched and tempered at 42HRC. Alternative embodiments may use any suitable material having a high yield stress and low hysteresis, such as aluminum 6061 or the like.

In the exemplary embodiment, battery 90 couples to acoustic receptor 89 and radio transmitter 91 to supply both with electric potential. Similar to acoustic transmitter 39, receptor 89 may be connected to receptor body 97 such that acoustic receptor 89 may receive the acoustic signal generated by acoustic transmitter 39 through the metal pipe of running string 19. Alternatively, the acoustic signal may pass through any suitable medium, such as liquid in riser 15 or liquid in running string 19, provided that acoustic transmitter 39 and acoustic receptor 89 arc positioned to generate and receive the signal through that medium. If so, receptor stem 87 will have a sensing portion submersed within liquid in riser 15 or running string 19. Radio transmitter 91 will be above the liquid so as to send an RF signal. Acoustic receptor 89 is in turn communicatively coupled with radio transmitter 91. When acoustic receptor 89 receives an acoustic signal from acoustic transmitter 39, acoustic receptor 89 will convert the signal to that which can be received by radio transmitter 91 and then transmit that signal to radio transmitter 91. Radio transmitter 91 will, in turn, convert the signal to a radio signal and transmit the signal to a radio receiver 123 (FIG. 8) on platform 11 (FIG. 1).

In operation as illustrated in FIG. 2 and FIG. 8, an operator will couple dynamometer stem 29 to running tool 31 and connect casing hanger 32 to running tool 31 as described below. The operator will then run drilling tool 31, dynamometer stem 29, and casing hanger 32 into riser 15. The operator makes up running string 19 and when running tool 31 is near the subsea wellhead assembly 13, will connect receptor stem 87 into running string 19 at platform 11. Receptor stem 87 will be above sea level. Dynamometer stem 29 is powered on prior to running dynamometer stem 29 subsea. Receptor stem 87 is powered on by the operator when the operator desires to know the operating torque at running tool 31. In the exemplary embodiment illustrated in FIG. 8, receptor stem 87 will be in range of wireless communication with a radio receiver 123 communicatively coupled to a display 125 in an operator's cabin located at floating platform 11, as illustrated in FIG. 1 and FIG. 8.

Figure 10:
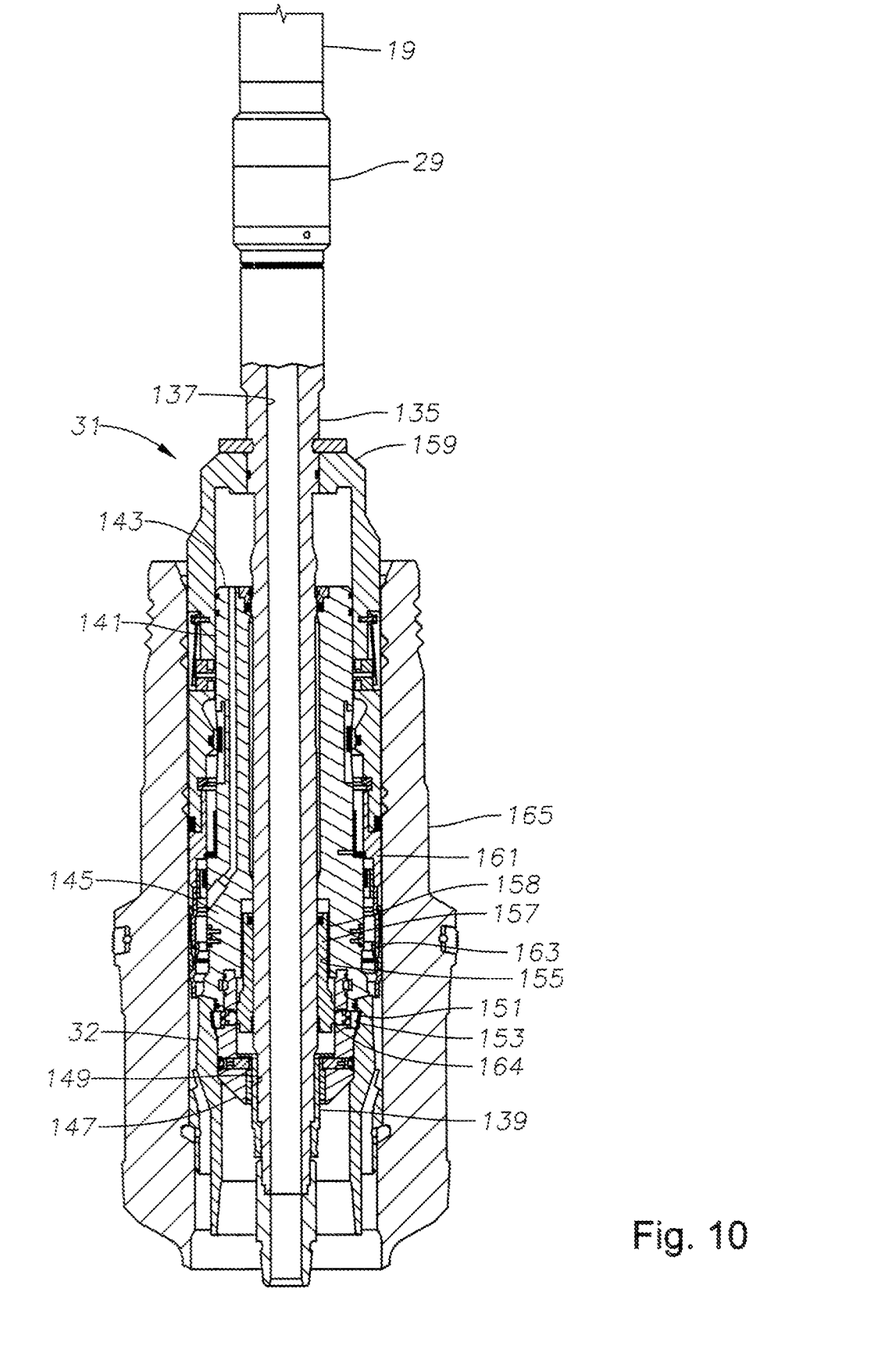
FIGS. 10-12 are schematic representations of a casing hanger running tool in operational steps of landing, setting, and/or testing a subsea wellhead consumable.

Torque and weight are applied to drill string 19 to actuate casing hanger 32 in the following manner. Referring to FIG. 10, there is generally shown an embodiment for a running tool 31 that is used to set a casing hanger. Running tool 31 is comprised of a stem 135. Stem 135 is a tubular member with an axial passage 137 extending therethrough. Stem 135 connects on its upper end to dynamometer 29. Dynamometer 29 then couples to running string 19, as described above. A lower portion of stem 135 has threads 139 on its outer surface.

Running tool 31 has an inner body 141 that surrounds stem 135, as stem 135 extends axially through inner body 141. Inner body 141 has an upper body portion 143 and a lower body portion 145. Lower body portion 145 of inner body 141 is connected to a bearing cap 147. Bearing cap 147 has threads 149 along its inner surface that are engaged with threads 139 on the outer surface of stem 135. Lower portion 145 of inner body 141 and bearing cap 147 house an engaging element 151. In this particular embodiment, engaging element 151 is a set of dogs having a smooth inner surface and a contoured outer surface. The contoured outer surface is adapted to engage a complimentary contoured surface 153 on the inner surface of a casing hanger 32 when the engagement element 151 is engaged with the casing hanger 32. Although not shown, a string of casing is attached to the lower end of casing hanger 32.

Lower body portion 145 of inner body 141 has an inner recess with threads 155 along its inner surface. A cam 157 is positioned between stem 135 and the inner recess of inner body 141. Cam 157 has threads 158 on its outer surface that are in engagement with the threads 155 on the surface of the inner recess of lower body portion 145 of inner body 141. Cam 157 and stem 135 are connected to one another such that cam 157 and stem 135 rotate in unison, but cam 157 may move axially relative to inner body 141, independent from stem 135. For example, cam 157 and stem 131 may be connected to one another by means of anti-rotation keys.

An outer body or piston 159 surrounds stem 135 and substantial portions of the inner body 141. Piston 159 is connected to stem 135 such that the two rotate and move in unison. A setting sleeve 161 is connected to the lower end of piston 159. Setting sleeve 161 carries a packoff seal 163 which is positioned along the lower end portion of setting sleeve 161. Packoff seal 163 will act to seal the casing hanger 32 to a high pressure housing 165 when properly set. While piston 159 is in the upper position, packoff seal 163 is spaced above casing hanger 32.

Referring to FIG. 10, in operation, running tool 31 is initially positioned such that it extends axially through a casing hanger 32. Piston 159 is in an upper position, and casing hanger packoff seal 163 is carried by setting sleeve 161 which is connected to piston 159. Running tool 31 is lowered into casing hanger 32 until the outer surface of inner body 141 and bearing cap 147 of running tool 31 slidingly engage the inner surface of casing hanger 32.

Once running tool 31 and casing hanger 32 are in abutting contact with one another, stem 135 is rotated four revolutions. As stem 135 rotates, a portion of it unthreads from bearing cap 147, and stem 135 and piston 159 move longitudinally downward relative to inner body 141. As the stem 135 is rotated relative to the inner body 141, cam 157 rotates in unison and simultaneously unthreads from inner body 141 and moves longitudinally downward relative to inner body 141. A shoulder 164 on the outer surface of the cam 157 makes contact with the engaging element 157, forcing it radially outward and in engaging contact with profile 153 on the inner surface of casing hanger 32, thereby locking inner body 141 to casing hanger 32. Once running tool 31 and casing hanger 32 are locked to one another, running tool 31 and casing hanger 32 are lowered down the riser into a high pressure housing 165 until casing hanger 32 comes to rest as shown in FIG. 10.

Figure 11:
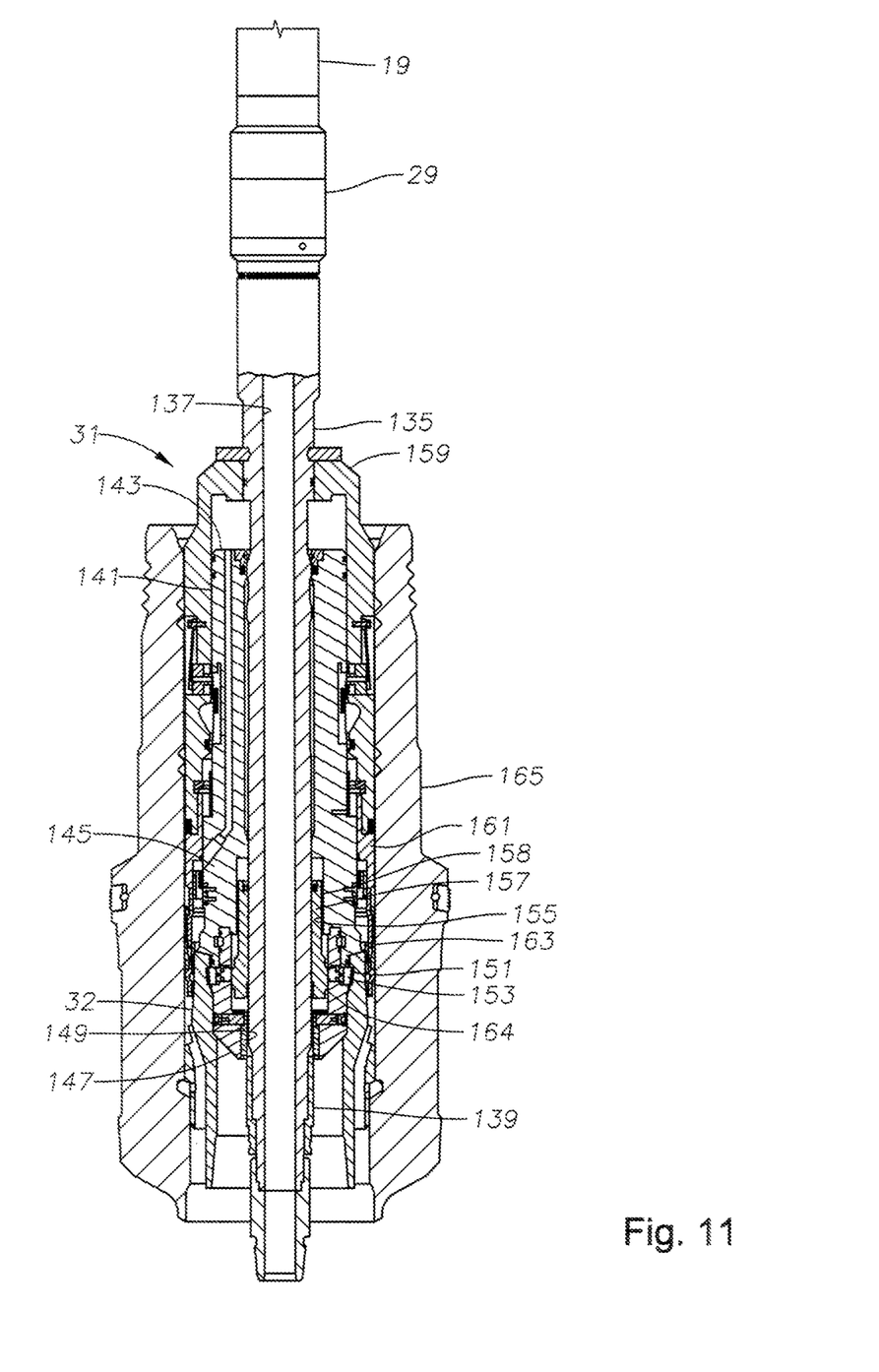

As illustrated in FIG. 11, stem 135 is then rotated four additional revolutions in the same direction. As stem 135 is rotated relative to the inner body 141, stem 135 completely unthreads from bearing cap 147, freeing stem 135 and piston 159 to move further longitudinally downward relative to inner body 141 and casing hanger 32. During rotation, deformation of dynamometer 29 will occur generating an output voltage at output nodes 72, 80 as described above with respect to FIGS. 4A-5B, that is then transmitted as described below.

Figure 12:
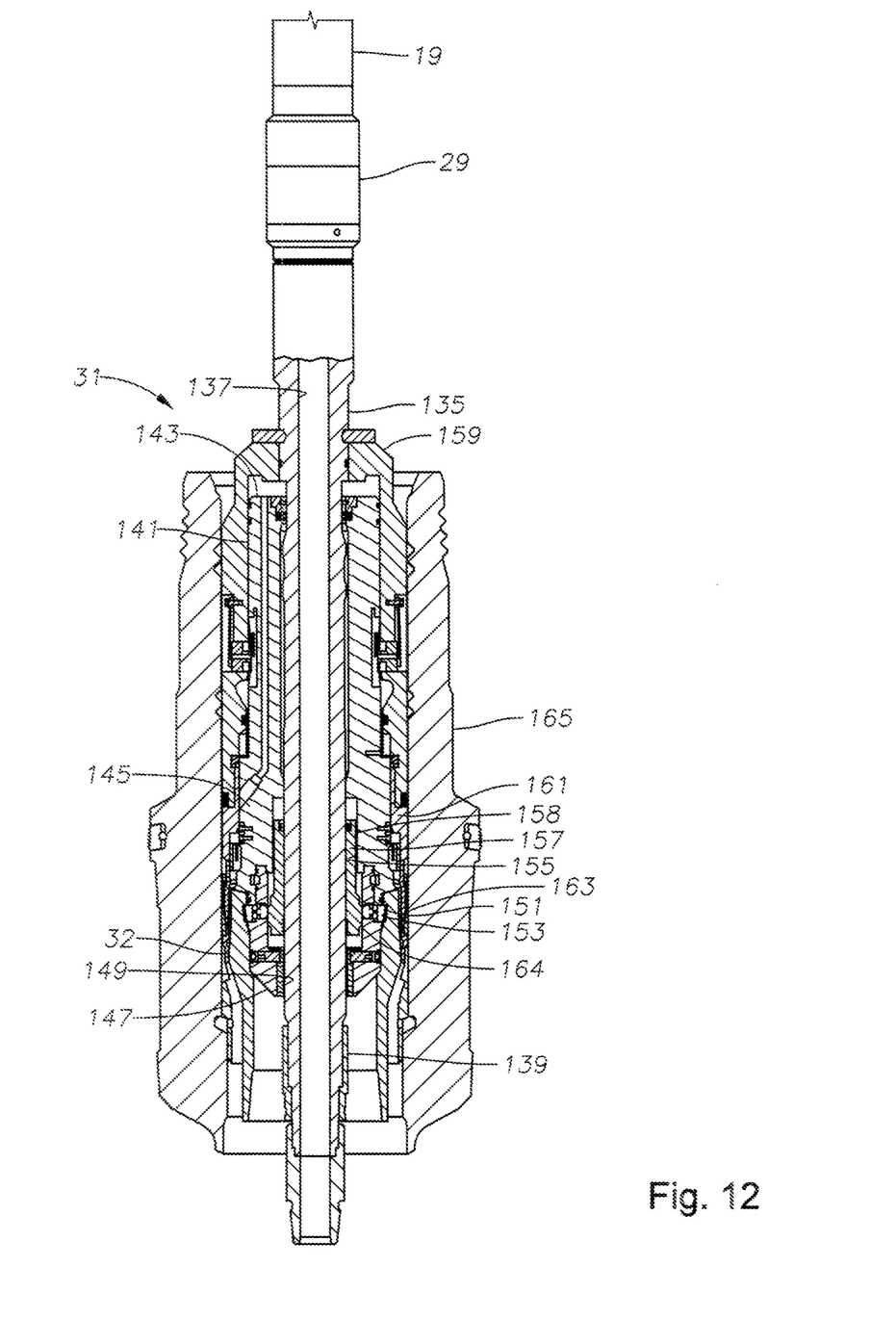

Referring to FIG. 12, weight is then applied downward on the string of drill pipe (not shown) and subsequently to dynamometer stem 29, stem 135, and piston 159. As stem 135 and piston 159 move further longitudinally downward relative to inner body 43, packoff seal 163 lands between the casing hanger 32 and high pressure housing 165, radially engaging the exterior surface of casing hanger 32 and the inner surface of high pressure housing 165. This sets casing hanger 32. The weight applied in this process will again deform dynamometer 29, generating an output voltage at output nodes 72, 80 that is then transmitted to the surface by dynamometer stem 29 as described below.

Dynamometer stem 29 will measure applied torque and weight at the downhole location of dynamometer stem 29 through the plurality of strain gauges 43 operating as described above. Acoustic transmitter 39 will then produce an acoustic signal representing the voltage difference produced by the plurality of strain gauges 43 in response to the applied load and the known voltage applied. The acoustic signal passes through running string 19, or liquid within or surrounding running string 19. Acoustic receptor 89 receives this acoustic signal, convert the acoustic signal into an electrical signal, and then relay the electrical signal to radio transmitter 91 where the signal is converted into a wireless signal that is then transmitted to radio receiver 123. Radio receiver 123 then converts the signal again to an electrical signal and transmits the signal to display 125 located proximate to the operator.

Display 125 will then convert the signal indicating the voltage at strain gauges 43 into a signal understood by the operator to report the actual applied weight and torque at the location of dynamometer stem 29 in wellhead 13 based on the calibration moment equation determined during calibration of dynamometer stem 29. From this, the operator will then be able to compare the applied torque and weight to that which his instrumentation will tell him he applied at platform 11. In this manner, the operator may then adjust the torque and weight at the surface to achieve the desired torque and weight at the location of dynamometer stem 29. A person skilled in the art will understand that the conversion of the communicative signals may be accomplished in any suitable manner. Similarly, calculation of the applied torque and weight at dynamometer stem 29 based on the response voltage produced by strain gauges 43 may be accomplished by any of the devices along the signal path or by an additional suitable device in communication with the apparatus.

Figure 9:
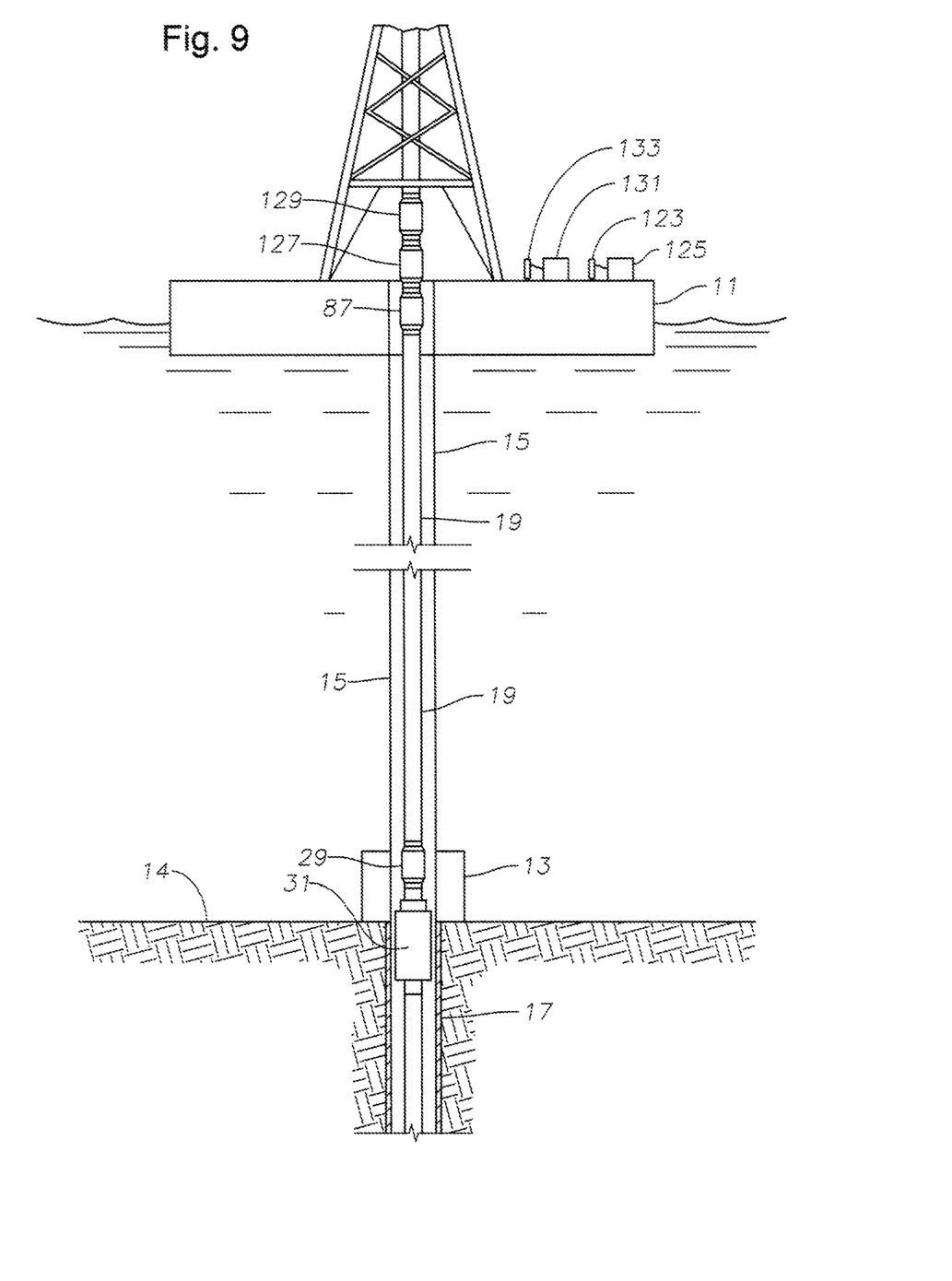
FIG. 9 is a schematic representation of an alternative embodiment of the present invention.

In an alternative embodiment illustrated in FIG. 9, a second dynamometer stem, or rotary table dynamometer 127 may be coupled inline to drill string 19 at the rotary table level along with a second receptor stem, or rotary table receptor 129. The alternative embodiment includes the elements of the embodiments of FIGS. 1-8 described above. Rotary table dynamometer 127 and rotary table receptor 129 include the components of and will operate as described above with respect to dynamometer stem 29 and receptor stem 87, respectively. Rotary table receptor 129 may communicate the signal received from rotary table dynamometer 127 to a second wireless receptor 133 that may then display the rotary table signal on a second display 131. In this manner, the operator my receive a second reading at the rotary table level that will allow the operator to better understand what is occurring downhole and to synchronize the data received for future study.

Accordingly, the disclosed embodiments provide numerous advantages. For example, the disclosed embodiments allow operators to have a better understanding of what is occurring down hole. In addition, it allows operators to accommodate for torque and weight loss by communicating to them in real time the actual applied torque and weight at a downhole location. In this manner, the disclosed embodiments help operators to ensure that equipment placed downhole is properly set and actuated, increasing the likelihood of successful drilling and production in subsea wells. In addition, it provides an indication to the operator that the platform is not aligned with the wellhead, giving the operator an opportunity to pull the riser to force vertical alignment of the platform over the wellhead.

It is understood that the present invention may take many forms and embodiments. Accordingly, several variations may be made in the foregoing without departing from the spirit or scope of the invention. Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A system for running a subsea wellhead component from a surface platform, comprising:
 a running tool having an upper end for coupling to a running string lowered from the platform, the running tool adapted to carry and set the component in a subsea wellhead;
 a dynamometer stem having a bidirectional torque and weight sensor and adapted to be coupled inline to a lower end portion of the running string, and further coupled to the running tool, so that the dynamometer stem will measure an applied torque and weight at the running tool and produce a sensor signal in response, the dynamometer stem comprising:
  a tubular body having a first portion and a second recessed portion, the second recessed portion defining a recess for accepting the sensor; and
  a sleeve circumscribing the recessed portion of the tubular body, and sealingly engaged with the tubular body to protect the sensor from the environment outside the sleeve;
  an acoustic transmitter mounted to the dynamometer stem and electrically connected to the torque and weight sensor for receiving the sensor signal from the torque and weight sensor, the acoustic transmitter being configured to transmit an acoustic signal through the running string;
 a receptor stem adapted to be coupled inline to an upper end portion of the running string above sea level;
 an acoustic receiver mounted to the receptor stem for receiving the acoustic signal from the acoustic transmitter;
 a radio frequency (RF) transmitter mounted to the receptor stem and electrically connected to the acoustic receiver for transmitting an RF signal that correlates with the acoustic signal received by the acoustic receiver;
 an RF receiver adapter to be located on the platform for receiving the RF signal from the RF transmitter; and
 a display connected with the RF receiver for displaying the signal in real time to an operator on the platform.

2. The system of claim 1, wherein the bidirectional torque and weight sensor comprises:
 a bidirectional load cell having at least eight strain gauges arranged into two wheatstone bridges;
 two strain gauges bonded to the dynamometer stem parallel to a dynamometer axis on diametric sides of the dynamometer stem;
 two strain gauges bonded to the dynamometer stem perpendicular to the dynamometer axis on diametric sides of the dynamometer stem, so that the parallel strain gauges and the perpendicular strain gauges may be communicatively coupled into a first wheatstone bridge to produce a voltage corresponding to a weight load applied to the dynamometer stem;
 two strain gauges bonded to the dynamometer stem at a forty-five degree angle to an axis perpendicular to the dynamometer axis on diametric sides of the dynamometer stem; and
 two strain gauges bonded to the dynamometer stem at a negative forty-five degree angle to the axis perpendicular to the dynamometer axis on diametric sides of they dynamometer stem, so that the strain gauges may be communicatively coupled into a second wheatstone bridge to produce a voltage corresponding to a torque load applied to the dynamometer stem.

3. A system for running a subsea wellhead component from a surface platform, comprising:
 a running string adapted to be lowered from the platform to a subsea wellhead;

a running tool having an upper end coupled to a lower end portion of the running string, the running tool adapted to carry and set the component in the subsea wellhead;

the running tool having a rotary device for exerting a setting force in response to rotation;

a dynamometer stem having a bidirectional load cell, the dynamometer stem being coupled inline to the running string and further coupled to the running tool, the dynamometer stem comprising:

a tubular body having a first portion and a second recessed portion, the second recessed portion defining a recess for accepting the load cell; and a sleeve circumscribing the second recessed portion of the tubular body, and sealingly engaged with the tubular body to protect the load cell from the environment outside the sleeve;

an acoustic signal transmitter coupled to the dynamometer stem and the bidirectional load cell;

the acoustic signal transmitter configured to receive a plurality of load cell signals from the bidirectional load cell and transmit acoustic signals in response through the running string;

an acoustic signal receptor coupled to an upper end portion of the running string and adapted to be above sea level for receiving the acoustical signals transmitted through the running string;

a radio frequency (RF) transmitter mounted to the upper end portion of the running string and electrically connected to the acoustic receiver for transmitting RF signals proportional to the acoustic signals received by the acoustic receiver;

an RF receiver adapted to be located on the platform for receiving the RF signals; and a display adapted to be located on the platform and configured to present the RF signals received by the RF receiver in a manner understood by an operator on the platform and mounted such that an operator may visually monitor the display in real time.

4. The system of claim 3, wherein the bidirectional load cell comprises at least eight strain gauges arranged into two wheatstone bridges.

5. A method for running a subsea wellhead device from a floating platform, comprising:

(a) providing a running tool weight and torque sensing system coupled inline to a lower end portion of a running string and to a running tool connected to a subsea wellhead device, the weight and torque sensing system having a sensor that senses weight and torque applied to the running tool and an acoustic transmitter, the weight and torque sensing system including a dynamometer stem that comprises:

a tubular body having a first portion and a second recessed portion, the second recessed portion defining a recess for accepting the sensor; and a sleeve circumscribing the second recessed portion of the tubular body, and sealingly engaged with the tubular body to protect the sensor from the environment outside the sleeve;

(b) lowering the running string and the sensing system down a subsea riser, coupling an acoustic receiver and radio frequency (RF) receiver inline to an upper end portion of the running string above sea level, and positioning the subsea wellhead device in engagement with a subsea wellhead assembly;

(c) operating the running tool to set the subsea device in the wellhead assembly;

(d) with the sensor, sensing weight and torque imposed on the running tool, and with the acoustic transmitter, transmitting an acoustic signal up the running string proportional to the weight and torque sensed; then (e) with the acoustic receiver, receiving the acoustic signal, and with the RF transmitter, transmitting an RF signal proportional to the acoustic signal to an RF receiver and a display at a drilling rig on the platform.

6. The method of claim 5, wherein step (c) comprises rotating the running string to rotate a portion of the running tool relative to the wellhead device.

7. The method of claim 5, wherein the sensor comprises a bi-directional load cell, and step (d) comprises:

deforming the dynamometer stem of the sensing system, the deformation changing a resistance of the bidirectional load cell; and generating the acoustic signal in response to the changed resistance.

8. The method of claim 7, wherein generating the acoustic signal comprises producing a voltage corresponding to a voltage applied to the bidirectional load cell and an applied load at the running tool.

9. The method of claim 5, wherein the method further comprises:

coupling a surface weight and torque sensing system to the upper end portion of the running string above sea level and while performing step (c);

generating a surface signal in a bidirectional load cell of the surface weight and torque sensing system in response to the operating of the running tool in step (c); and transmitting the surface signal from the bidirectional load cell of the surface weight and torque sensing system to platform.

10. The method of claim 5, wherein step (c) comprises applying at least part of a weight of the running string to the subsea wellhead device.

11. The method of claim 5, wherein step (c) comprises pulling upward on the running string after the subsea wellhead device has been set to test whether the subsea wellhead device is properly set.

* * * * *